No. 832,213. PATENTED OCT. 2, 1906.
B. F. SCHMIDT.
SPRING ATTACHMENT FOR GUN STOCKS.
APPLICATION FILED JAN. 17, 1906.
2 SHEETS—SHEET 1.
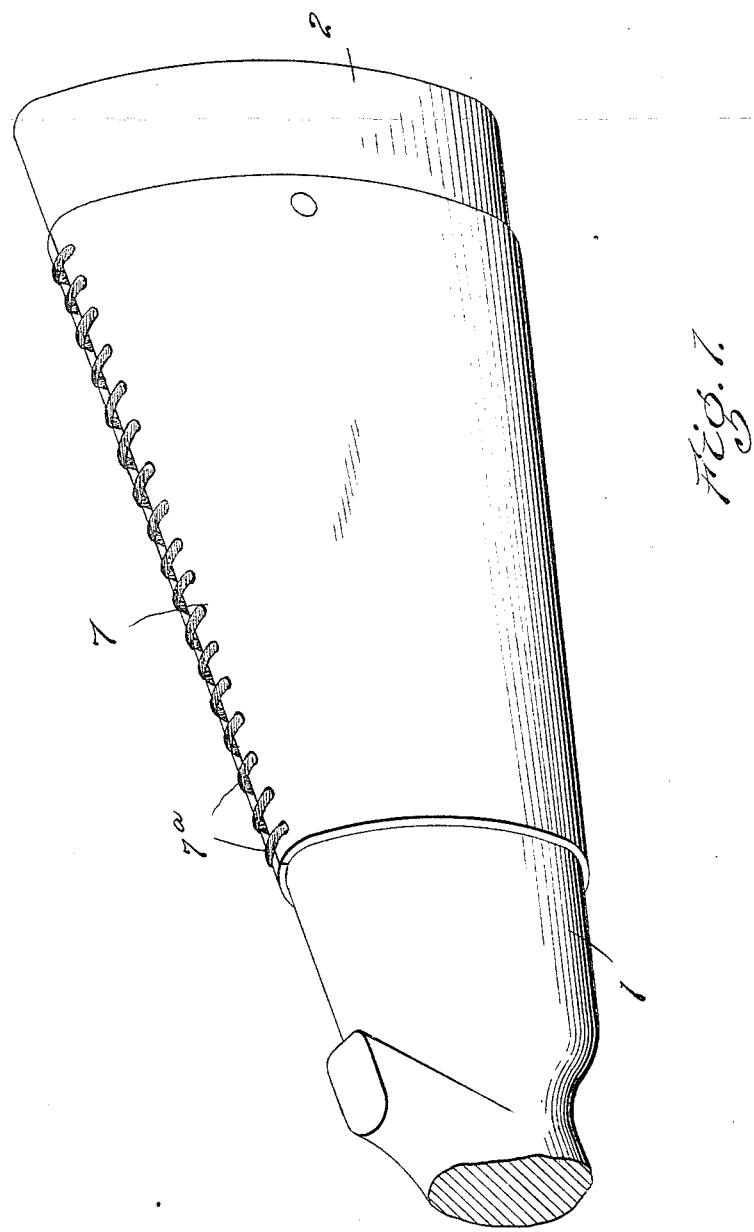
WITNESSES:
G. R. Thomas
K. G. Whitcomb
INVENTOR
B. F. Schmidt
By
Swift & Co.
Attorneys No. 832,213. PATENTED OCT. 2, 1906.
B. F. SCHMIDT.
SPRING ATTACHMENT FOR GUN STOCKS.
APPLICATION FILED JAN. 17, 1906.
2 SHEETS—SHEET 2.
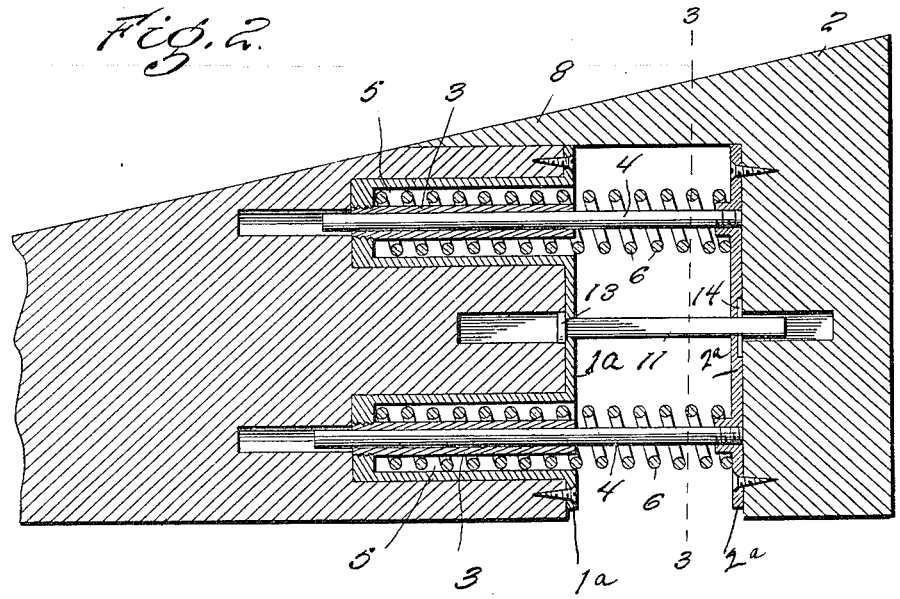
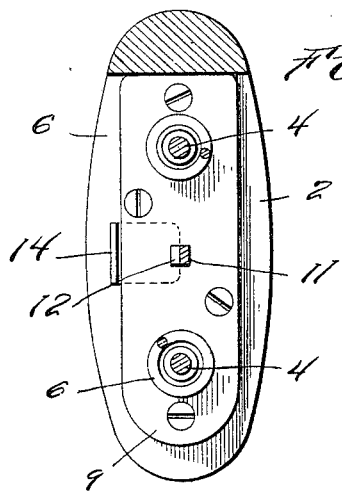
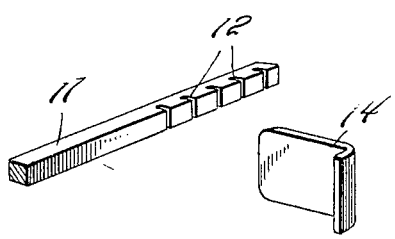
WITNESSES:
G. R. Thomas
K. G. Whitcomb
INVENTOR
B. F. Schmidt
By Swift & Co.
Attorneys

UNITED STATES PATENT OFFICE.

BENJAMIN F. SCHMIDT, OF MODESTO, CALIFORNIA.

SPRING ATTACHMENT FOR GUN-STOCKS.

No. 832,213.　　　　Specification of Letters Patent.　　　　Patented Oct. 2, 1906.

Application filed January 17, 1906. Serial No. 296,521.

*To all whom it may concern:*

Be it known that I, BENJAMIN F. SCHMIDT, a citizen of the United States, residing at Modesto, in the county of Stanislaus and State of California, have invented a new and useful Spring Attachment for Gun-Stocks; and I do hereby declare the following to be a full, clear, and exact description of the invention, such as will enable others skilled in the art to which it appertains to make and use the same.

The invention relates to spring attachments for gun-stocks, and has for its object to provide a device of this character of simple, efficient, and durable construction which will greatly diminish the shock or jar caused by the discharge of a gun.

A further object of the invention is to provide a device of this character having means for adjusting the length of the gun-stock, as will be hereinafter more clearly set forth in detail, and particularly pointed out in the appended claims.

In the drawings forming part of this specification, and in which like numerals of reference designate corresponding parts, Figure 1 is an inverted perspective view of a gun-stock constructed in accordance with this invention. Fig. 2 is a longitudinal sectional view. Fig. 3 is a transverse sectional view. Fig. 4 is a detail perspective view of the notched end of the adjusting-bar and the slide.

Referring to the drawings, 1 and 2 designate the two sections of an ordinary gun-stock having my invention applied thereto. The sections 1 and 2 have secured to them a pair of plates $1^a$ and $2^a$, respectively. The plate $1^a$ is provided with a pair of casings 5, which are adapted to enter suitable recesses in the section 1. The casings 5 are provided with a pair of smaller or inner casings 3, which are adapted to receive a pair of rods 4. The rods 4 are preferably screwed to the plate $2^a$ and snugly fit into the casings 3 and are adapted to reciprocate therein, as will be readily understood. A pair of springs 6 are arranged between the casings 3 and 5 and engage the inner ends of the casings 5 and the plate $2^a$. It will be observed that the section 2 is approximately L-shaped, having a lateral portion 8, which, with the leather casing 7, holds the two sections 1 and 2 in engagement with each other and at the same time permit a reciprocating movement of the section 1 when the gun is discharged, by which the shock will be made to fall on the section 1, which presses against the springs, by which its effect on the operator will be greatly reduced. The leather casing is secured to the gun-stock by screws or short nails and a suitable lacing $7^a$.

The tension of the springs may be regulated, as well as the length of the stock may be adjusted, by means of a bar or rod 11, which is provided with suitable notches 12 and which passes through the plates $1^a$ and $2^a$. The bar 11 is provided with a head 13 at one end, and the other is notched, and said notches are adapted to be engaged by a suitable slide or plate 14, which is adapted to slide between the section 2 and the plate $2^a$. By this arrangement the head of the bar engaging the inner face of the plate $1^a$ and the slide 14 passing between the plate $2^a$ and section 2 it will be seen that the sections 1 and 2 may be readily adjusted and the tension of the springs regulated.

What I claim is—

1. A gun-stock having an L-shaped member, and an outer casing, a movable member engaging the same, and means for reciprocating said movable member.

2. A gun-stock having an L-shaped member, and an outer casing, a movable member engaging the same, and springs interposed between said members.

3. A gun-stock having two members, one of said members being L-shaped, an outer casing engaging said members, one of said members having recesses adapted to receive a pair of casings, rods rigidly secured to said L-shaped member and adapted to reciprocate within said casings, springs arranged on the interior of said casings, and adapted to press said members apart.

4. A gun-stock composed of two sections, and having plates secured to the inner face of said sections, springs interposed between said sections, a bar connected with one of said plates, and having a notched end passing through an aperture in said other plate, means for engaging said notched end, rods rigidly secured to one of said sections, and having free ends reciprocating in said other section, and springs arranged between said rods and casings.

5. A gun-stock composed of two members, having plates on the inner faces thereof, a bar connected with one of said plates and having a notched end passing through an aperture in said other plate, a slidable plate adapted to engage said notches, and springs interposed between said members.

6. A gun-stock composed of two sections, having plates on each inner face thereof, springs interposed between said sections, a rod connected with one plate and having a notched end passing through said other plate, and means for engaging said notched end.

In testimony whereof I have hereto affixed my signature in the presence of two witnesses.

BENJAMIN F. SCHMIDT.

Witnesses:
FRED SCHMIDT,
WILLIAM F. COFFER.